United States Patent
Molyneaux et al.

(10) Patent No.: US 9,001,118 B2
(45) Date of Patent: Apr. 7, 2015

(54) AVATAR CONSTRUCTION USING DEPTH CAMERA

(75) Inventors: David Molyneaux, Kirkland, WA (US); Xin Tong, Beijing (CN); Zicheng Liu, Bellevue, WA (US); Eric Chang, Beijing (CN); Fan Yang, Beijing (CN); Jay Kapur, Redmond, WA (US); Emily Yang, Seattle, WA (US); Yang Liu, Beijing (CN); Hsiang-Tao Wu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/585,540

(22) Filed: Aug. 14, 2012

(65) Prior Publication Data
US 2013/0342527 A1     Dec. 26, 2013

Related U.S. Application Data

(63) Continuation of application No. PCT/CN2012/077303, filed on Jun. 21, 2012.

(51) Int. Cl.
*G06T 15/00*     (2011.01)
*A63F 13/213*    (2014.01)
(Continued)

(52) U.S. Cl.
CPC .............. *G06T 7/0032* (2013.01); *A63F 13/213* (2013.01); *A63F 13/655* (2013.01);
(Continued)

(58) Field of Classification Search
None
See application file for complete search history.

(56) References Cited

U.S. PATENT DOCUMENTS

| 4,288,078 A | 9/1981 | Lugo |
| 4,627,620 A | 12/1986 | Yang |

(Continued)

FOREIGN PATENT DOCUMENTS

| CN | 1928908 A | 3/2007 |
| CN | 101254344 A | 9/2008 |

(Continued)

OTHER PUBLICATIONS

Aitpayev, et al., "Creation of 3D Human Avatar using Kinect", Retrieved at <<http://www.asian-transactions.org/Journals/Vol01Issue06/ATFECM/ATFECM-30120064.pdf>>, Proceedings: Asian Transactions on Fundamentals of Electronics, Communication & Multimedia (ATFECM) vol. 01, Issue 05, pp. 1-3.
(Continued)

*Primary Examiner* — Devona Faulk
*Assistant Examiner* — William Beutel
(74) *Attorney, Agent, or Firm* — Bryan Webster; Kate Drakos; Micky Minhas (57) ABSTRACT

A method for constructing an avatar of a human subject includes acquiring a depth map of the subject, obtaining a virtual skeleton of the subject based on the depth map, and harvesting from the virtual skeleton a set of characteristic metrics. Such metrics correspond to distances between predetermined points of the virtual skeleton. In this example method, the characteristic metrics are provided as input to an algorithm trained using machine learning. The algorithm may be trained using a human model in a range of poses, and a range of human models in a single pose, to output a virtual body mesh as a function of the characteristic metrics. The method also includes constructing a virtual head mesh distinct from the virtual body mesh, with facial features resembling those of the subject, and connecting the virtual body mesh to the virtual head mesh.

20 Claims, 8 Drawing Sheets

(51) Int. Cl.

| | | |
|---|---|---|
| *A63F 13/655* | (2014.01) | |
| *G06K 9/00* | (2006.01) | |
| *G06K 9/62* | (2006.01) | |
| *G06T 7/00* | (2006.01) | |
| *G06T 13/40* | (2011.01) | |
| *G06T 17/20* | (2006.01) | |

(52) U.S. Cl.
CPC ........ *G06K9/00214* (2013.01); *G06K 9/00369* (2013.01); *G06K 9/6211* (2013.01); *G06T 13/40* (2013.01); *G06T 17/20* (2013.01); *G06T 2207/10028* (2013.01)

(56) References Cited

U.S. PATENT DOCUMENTS

| | | |
|---|---|---|
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein, Jr. |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie et al. |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng |
| 6,098,458 A | 8/2000 | French et al. |
| 6,100,896 A | 8/2000 | Strohecker et al. |
| 6,101,289 A | 8/2000 | Kellner |
| 6,130,677 A | 10/2000 | Kunz |
| 6,141,463 A | 10/2000 | Covell et al. |
| 6,147,678 A | 11/2000 | Kumar et al. |
| 6,148,003 A | 11/2000 | Van Dort |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,195,104 B1 | 2/2001 | Lyons |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,901,379 B1 | 5/2005 | Balter et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,062,454 B1 | 6/2006 | Giannini et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |

(56) References Cited

U.S. PATENT DOCUMENTS

| | | |
|---|---|---|
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 2001/0034668 A1 | 10/2001 | Whitworth |
| 2007/0229498 A1* | 10/2007 | Matusik et al. ............... 345/420 |
| 2008/0026838 A1 | 1/2008 | Dunstan et al. |
| 2008/0071559 A1 | 3/2008 | Arrasvuori |
| 2008/0163344 A1 | 7/2008 | Yang |
| 2008/0252637 A1 | 10/2008 | Berndt et al. |
| 2009/0163262 A1 | 6/2009 | Kang |
| 2010/0030578 A1 | 2/2010 | Siddique et al. |
| 2010/0070384 A1 | 3/2010 | Kruusmaa et al. |
| 2010/0097375 A1 | 4/2010 | Tadaishi et al. |
| 2010/0111370 A1 | 5/2010 | Black et al. |
| 2010/0134490 A1 | 6/2010 | Corazza et al. |
| 2010/0302138 A1 | 12/2010 | Poot et al. |
| 2011/0022965 A1 | 1/2011 | Lawrence et al. |
| 2011/0025689 A1* | 2/2011 | Perez et al. .................... 345/420 |
| 2011/0043610 A1 | 2/2011 | Ren et al. |
| 2011/0148864 A1 | 6/2011 | Lee et al. |
| 2011/0157306 A1* | 6/2011 | Lin et al. ........................ 348/43 |
| 2011/0234581 A1 | 9/2011 | Eikelis et al. |
| 2011/0234589 A1 | 9/2011 | Lee et al. |
| 2011/0292036 A1* | 12/2011 | Sali et al. ...................... 345/419 |
| 2012/0019517 A1* | 1/2012 | Corazza et al. ............... 345/419 |
| 2012/0070070 A1* | 3/2012 | Litvak ........................... 382/154 |
| 2012/0113106 A1* | 5/2012 | Choi et al. .................... 345/419 |
| 2012/0183238 A1* | 7/2012 | Savvides et al. ............. 382/285 |

FOREIGN PATENT DOCUMENTS

| | | |
|---|---|---|
| CN | 102221886 A | 10/2011 |
| CN | 102222329 A | 10/2011 |
| CN | 102222347 A | 10/2011 |
| CN | 102508867 A | 6/2012 |
| EP | 0583061 A2 | 2/1994 |
| JP | 08044490 A | 2/1996 |
| WO | 9310708 A1 | 6/1993 |
| WO | 9717598 A1 | 5/1997 |
| WO | 9944698 A2 | 9/1999 |
| WO | 2009026726 A1 | 3/2009 |

OTHER PUBLICATIONS

"AdDude's Insights", Retrieved at <<http://lifson.com/?tag=augmented-reality>>, Apr. 9, 2010, 13 Pages.

Aggarwal et al., "Human Motion Analysis: A Review", IEEE Non-rigid and Articulated Motion Workshop, Jul. 1997, University of Texas at Austin, Austin, TX.

Ashdown, et al., "S08-CR03 Development of Visual Fit Assessment Tool for Apparel Firm", Retrieved at <<http://www.ntcresearch.org/pdf-rpts/AnRp08/S08-CR03-A8.pdf>>, in National Textile Center Annual Report, Nov. 2008, pp. 1-7.

Azarbayejani et al., "Visually Controlled Graphics", Jun. 1993, vol. 15, No. 6, IEEE Transactions on Pattern Analysis and Machine Intelligence.

"Behind an Inspired Room. Or, how I revamped a living room from 793 miles away!", Blog website, InspiredRoomDesign.com, Sep. 15, 2009, Inspired Room Design, LLC, Site by BrightBridge Studios, http://inspiredroomdesign.com/blog.php?post=19.

Breen et al., "Interactive Occlusion and Collusion of Real and Virtual Objects in Augmented Reality", Technical Report ECRC-95-02, Feb. 1995, European Computer-Industry Research Center GmbH, Munich, Germany.

Brogan et al., "Dynamically Simulated Characters in Virtual Environments", Sep./Oct. 1998, pp. 2-13, vol. 18, Issue 5, IEEE Computer Graphics and Applications.

State Intellectual Property Office of China, Office Action issued in Chinese Patent Application No. 201110087429.5, Dec. 4, 2012, 6 pages.

State Intellectual Property Office of China, Office Action issued in Chinese Patent Application No. 201110087429.5, Jul. 30, 2013, 13 pages.

Ferenstein, Gregory., "KinectShop: The Next Generation of Shopping", Retrieved at <<http://www.fastcompany.com/1758674/the-next-generation-of-shopping-kinectshop-exclusive>>, Jun. 9, 2011, 4 Pages.

Fisher et al., "Virtual Environment Display System", ACM Workshop on Interactive 3D Graphics, Oct. 1986, Chapel Hill, NC.

"Fits.me Virtual Fitting Room", Retrieved at <<http://www.fits.me/>>, Fits.me, Dec. 27, 2011, 1 Page.

Freeman et al., "Television Control by Hand Gestures", Dec. 1994, Mitsubishi Electric Research Laboratories, TR94-24, Caimbridge, MA.

Granieri et al., "Simulating Humans in VR", The British Computer Society, Oct. 1994, Academic Press.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Hauswiesner, et al., "Free Viewpoint Virtual Try-On With Commodity Depth Cameras", Retrieved at <<http://www.icg.tugraz.at/kinectclothpaper>>, In Proceedings of the 10th International Conference on Virtual Reality Continuum and Its Applications in Industry, Dec. 11-12, 2011, 8 Pages.

He, "Generation of Human Body Models", Apr. 2005, University of Auckland, New Zealand, 111 pages.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Isard et al., "CONDENSATION—Conditional Density Propagation for Visual Tracking", Aug. 1998, pp. 5-28, International Journal of Computer Vision 29(1), Netherlands.

Javed, et al., "Plan for Integration", Retrieved at <<http://taik.aalto.fi/fi/research/designium/publications/smart_store_s53_96_n.pdf>>, Retrieved Date: Dec. 27, 2011, pp. 53-96.

Jojic, "A Framework for Garment Shopping Over the Internet", to appear in May 1999 in Handbook of Electronic Commerce, edited by Mike Shaw, Springer Verlag, 22 pages.

(56) References Cited

OTHER PUBLICATIONS

Kanade et al., "A Stereo Machine for Video-rate Dense Depth Mapping and Its New Applications", IEEE Computer Society Conference on Computer Vision and Pattern Recognition, Jun. 1996, pp. 196-202,The Robotics Institute, Carnegie Mellon University, Pittsburgh, PA.

Kohler, "Special Topics of Gesture Recognition Applied in Intelligent Home Environments", In Proceedings of the Gesture Workshop, Sep. 1997, pp. 285-296, Germany.

Kohler, "Technical Details and Ergonomical Aspects of Gesture Recognition applied in Intelligent Home Environments", Sep. 1997, Germany, 35 pages.

Kohler, "Vision Based Remote Control in Intelligent Home Environments", University of Erlangen-Nuremberg/ Germany, Nov. 1996, pp. 147-154, Germany.

Livingston, "Vision-based Tracking with Dynamic Structured Light for Video See-through Augmented Reality", 1998, University of North Carolina at Chapel Hill, North Carolina, USA,145 pages.

Mhatre, Nachiket., "Kinect Delivers Augmented Reality Shopping", Retrieved at <<http://www.techtree.com/India/News/Kinect_Delivers_Augmented_Reality_Shopping/551-115193-585.html>>, May 11, 2011, 3 Pages.

Miyagawa et al., "CCD-Based Range Finding Sensor", Oct. 1997, pp. 1648-1652, vol. 44 No. 10, IEEE Transactions on Electron Devices.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Qian et al., "A Gesture-Driven Multimodal Interactive Dance System", Jun. 2004, pp. 1579-1582, IEEE International Conference on Multimedia and Expo (ICME), Taipei, Taiwan.

Rosenhahn et al., "Automatic Human Model Generation", Sep. 2005, pp. 41-48, University of Auckland (CITR), New Zealand.

"Sears Transforms the Online Shopping Experience with Help From IBM and My Virtual Model", Press Release, Mar. 9, 2009, http://www-01.ibm.com/software/success/cssdb.nsf/CS/CPOR-7PW4TU?OpenDocument&Site=default&cty=en_us, 3 pages.

Shao et al., "An Open System Architecture for a Multimedia and Multimodal User Interface", Aug. 24, 1998, Japanese Society for Rehabilitation of Persons with Disabilities (JSRPD), Japan, 8 pages.

Sheridan et al., "Virtual Reality Check", Technology Review, Oct. 1993, pp. 22-28, vol. 96, No. 7.

"Simulation and Training", 1994, Division Incorporated.

Stevens, "Flights into Virtual Reality Treating Real World Disorders", The Washington Post, Mar. 27, 1995, Science Psychology, 2 pages.

Toyama, K. et al., "Probabilistic Tracking in a Metric Space", Eighth International Conference on Computer Vision, Vancouver, Canada, vol. 2, Jul. 2001, 8 pages.

"Virtual High Anxiety", Tech Update, Aug. 1995, pp. 22.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Zhao, "Dressed Human Modeling, Detection, and Parts Localization", Jul. 26, 2001, The Robotics Institute, Carnegie Mellon University, Pittsburgh, PA.

State Intellectual Property Office of China, International Search Report of PCT/CN2012/077303, WIPO, Mar. 28, 2013, 3 pages.

Anguelov, D. et al., "SCAPE: Shape Completion and Animation of People", Proceedings of ACM SIGGRAPH 2005, pp. 408-416, Jul. 2005, 9 pages.

Zhou, S. et al., "Parametric Reshaping of Human Bodies in Images", Proceedings of ACM SIGGRAPH 2010, Article No. 126, Jul. 2010, 10 pages.

* cited by examiner

AVATAR CONSTRUCTION USING DEPTH CAMERA

CROSS REFERENCE TO RELATED APPLICATIONS

This application is a continuation of Patent Cooperation Treaty (PCT) Application PCT/CN2012/077303 filed 21 Jun. 2012, entitled AVATAR CONSTRUCTION USING DEPTH CAMERA. The entirety of this application is hereby incorporated by reference herein for all purposes.

BACKGROUND

An avatar is a posable, virtual representation of a subject—e.g., a human subject. At the present time, avatars are used commonly in video games to represent players, but many other applications are possible as well. For applications outside the world of gaming, the representation of a human subject as an avatar may be limited by the cost and complexity of constructing an avatar of suitable fidelity. In particular, capturing a subject's shape and facial features in enough detail to construct a life-like avatar may require lengthy image acquisition using expensive, studio-quality equipment.

SUMMARY

One embodiment of this disclosure provides a method for constructing an avatar of a human subject. The method includes acquiring a depth map of the subject, obtaining a virtual skeleton of the subject based on the depth map, and harvesting from the virtual skeleton a set of characteristic metrics. Such metrics correspond to distances between predetermined points of the virtual skeleton. In this example method, the characteristic metrics are provided as input to an algorithm trained using machine learning. The algorithm may be trained using an actual human model in a range of poses, and a range of human models in a single pose, to output a virtual body mesh as a function of the characteristic metrics. The method also includes constructing a virtual head mesh distinct from the virtual body mesh, with facial features resembling those of the subject, and connecting the virtual body mesh to the virtual head mesh.

This Summary is provided to introduce, in simplified form, a selection of concepts that are further described in the Detailed Description. This Summary is not intended to identify key features or essential features of the claimed subject matter, nor is it intended to be used to limit the scope of the claimed subject matter. Furthermore, the claimed subject matter is not limited to implementations that solve any disadvantages noted in any part of this disclosure.

DETAILED DESCRIPTION

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

An 'avatar', in accordance with the present disclosure, is a computer representation of a human subject. An avatar may be embodied by one or more suitable data structures, including, but not limited to, a polygonal mesh. In some embodiments, the avatar may be rendered for display. In other embodiments, the avatar is not rendered for display. The balance of this disclosure presents various systems and methods for constructing an avatar of a human subject. These systems and methods may be used in various applications—e.g., video games, interactive training software, physical therapy, or in a retail setting. More generally, an avatar can be used wherever a virtual representation of the subject is desired.

One example application of an avatar in a retail setting is to enable a customer to 'try on' various items virtually. Such items may include clothing, eyewear, footwear, accessories, prostheses, jewelry, tattoos, and/or make-up, as examples. Having augmented her avatar with such items in virtual form, the customer may be able to predict how she might look when wearing the corresponding actual items. This approach can be used to pre-screen the items prior to an actual visit to the fitting room, to save time. In addition, the customer may elect to share with others the images of her avatar augmented with the virtual items. In some scenarios, the sharing can be done remotely—via email or cell phone, for example—with friends or family members not physically present. In this manner, the customer may profit from another's counsel before making a decision to purchase an item. In an avatar-based on-line retail experience, the entire process of selecting an item, trying the item on, and then purchasing the item can be conducted in the privacy of the customer's home or workplace.

With current technology, there is a steep fidelity-versus-cost curve for avatar construction. Low-fidelity avatars suitable for video-game applications can be constructed simply, using inexpensive equipment. However, the applications noted above may require an avatar of much higher fidelity. A high-fidelity avatar—one that actually resembles a given human subject—is typically constructed using specialized, studio-quality equipment. In particular, a high-resolution depth camera may be used to acquire the three-dimensional image data on which the avatar is based.

In recent years, state-of-the-art consumer depth cameras have appeared in the form of a user-input device for video-game systems and personal computers. One example is the Kinect® system from Microsoft Corporation of Redmond, Wash. The systems and methods described herein may use depth cameras to furnish depth data from which a life-like avatar of a human subject is constructed. In these systems and methods, the resolution of the avatar is not limited by the resolution of the depth camera. Instead, this approach applies a sophisticated head- and body-modeling technique in which a set of characteristic metrics derived from the depth data guides the construction of a high-resolution, life-like body model, which there may be optionally connected to an analogously constructed head model and optionally augmented with life-like skin color and skin texture.

Figure 1:
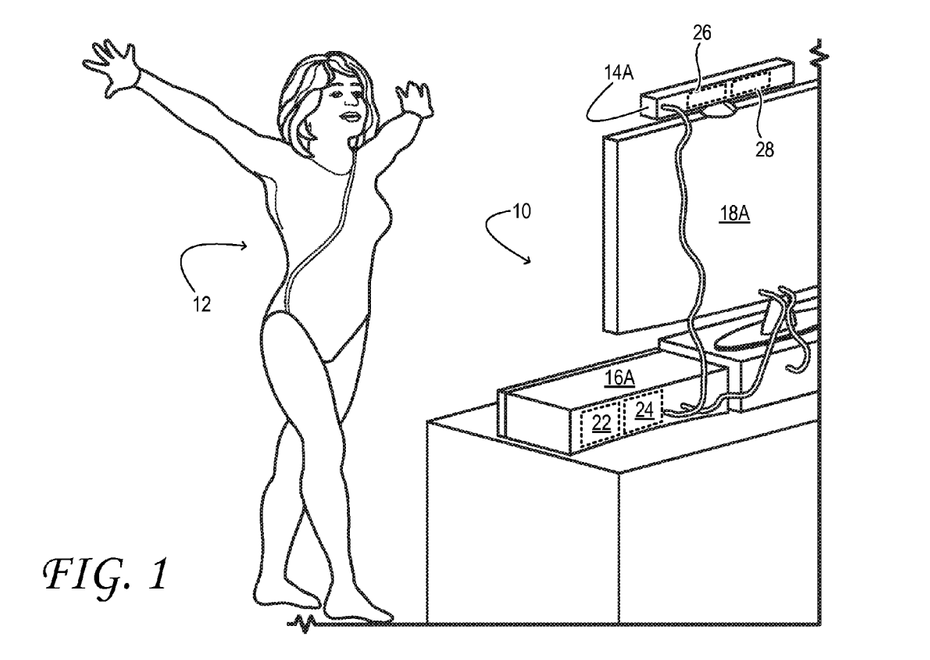
FIG. 1 shows a system for constructing an avatar of a human subject in accordance with an embodiment of this disclosure.

FIG. 1 shows, in one embodiment, a system 10 for constructing an avatar of a human subject 12. The system includes a vision-based, user-input device 14A, which is positioned to sight the subject. In the illustrated embodiment, the user-input device is operatively coupled to personal computer 16A, which is operatively coupled to monitor 18A. In one, non-limiting embodiment, the user-input device may be a Kinect® system, and the personal computer may be a video-game system, such as the XBOX 360® from Microsoft corporation. The personal computer may include a logic subsystem 22 with an associated storage subsystem 24, as described in further detail hereinafter. The storage subsystem may include instructions that cause the logic subsystem to enact aspects of the methods here described.

In the embodiment illustrated in FIG. 1, user-input device 14A includes a depth camera 26 configured to acquire a depth map of subject 12. The user-input device also includes a color camera 28 configured to acquire a color image of at least the subject's face. More generally, the nature and number of cameras in the user-input device may differ in the various embodiments of this disclosure. Such cameras may be configured to acquire image data from which the depth map is obtained via downstream processing. As used herein, the term 'depth map' refers to an array of pixels registered to corresponding regions of an imaged scene, with a depth value of each pixel indicating the depth of the corresponding region. 'Depth' is defined as a coordinate parallel to the optical axis of the depth camera, which increases with increasing distance from the user-input device.

In one embodiment, image data from a pair of stereoscopic cameras may be co-registered and mathematically combined to yield a depth map. In other embodiments, user-input device 14A may be configured to project a structured infrared illumination comprising numerous, discrete features (e.g., lines or dots). The depth camera may be configured to image the structured illumination reflected from the subject. Based on the spacings between adjacent features in the various regions of the imaged subject, a depth map of the subject may be constructed.

In other embodiments, user-input device 14A may be configured to project a pulsed infrared illumination. A pair of cameras may be configured to detect the pulsed illumination reflected from the subject. Both cameras may include an electronic shutter synchronized to the pulsed illumination, but the integration times for the cameras may differ such that a pixel-resolved time-of-flight of the pulsed illumination, from the source to the subject and then to the cameras, is discernable from the relative amounts of light received in corresponding pixels of the two cameras.

The configurations described above enable various methods for constructing an avatar of a human subject. Some such methods are now described, by way of example, with continued reference to the above configurations. It will be understood, however, that the methods here described, and others within the scope of this disclosure, may be enabled by different configurations as well. The methods may be entered upon any time system 10 is operating, and may be executed repeatedly. Some of the process steps described and/or illustrated herein may, in some embodiments, be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Figure 2:
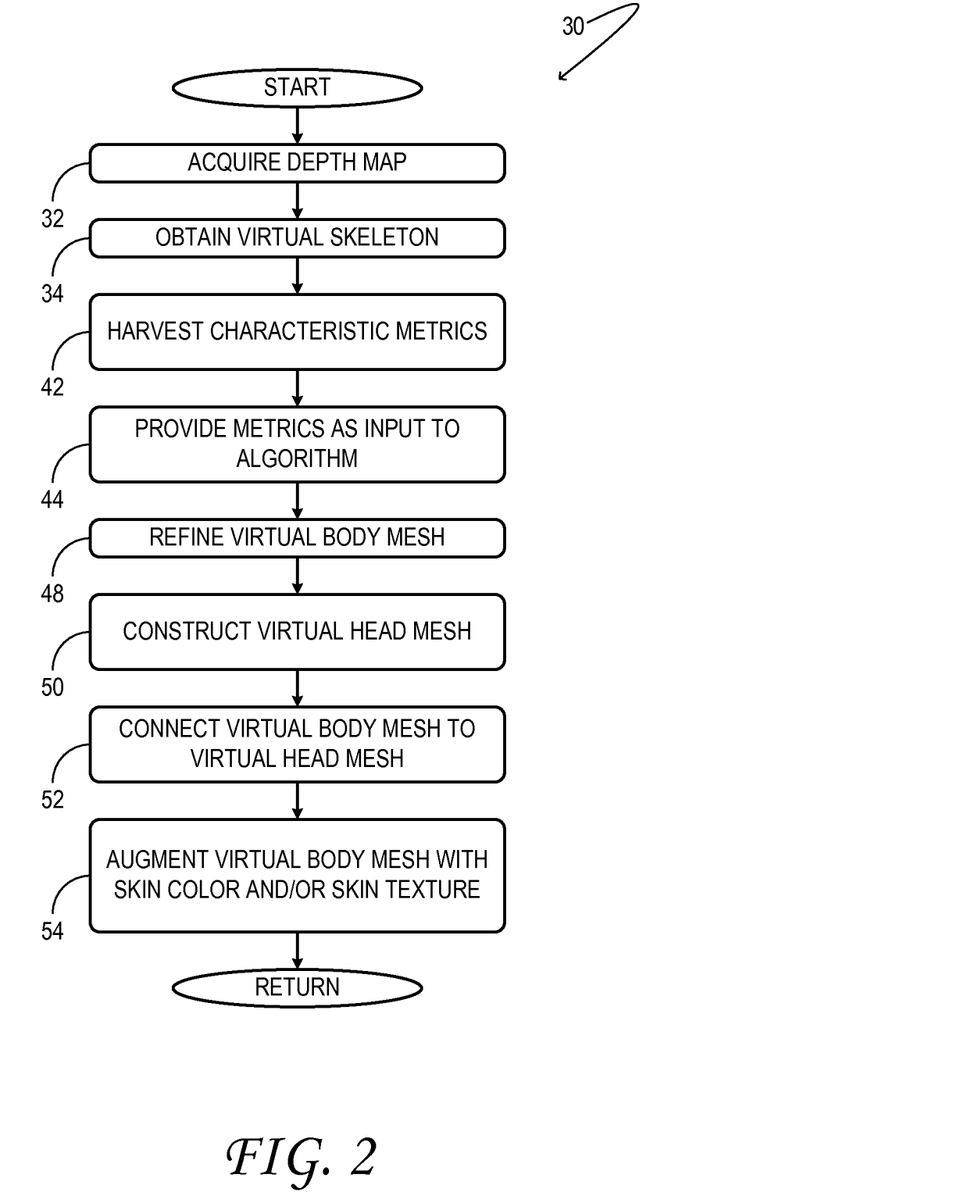
FIG. 2 illustrates a method to construct an avatar of a human subject in accordance with an embodiment of this disclosure.

FIG. 2 illustrates an example method 30 to construct an avatar of a human subject. At 32 of method 30, a depth map of the subject acquired. In the various embodiments here contemplated, the depth map may be acquired in or from a user-input device, such as user-input device 14A.

Figure 3:
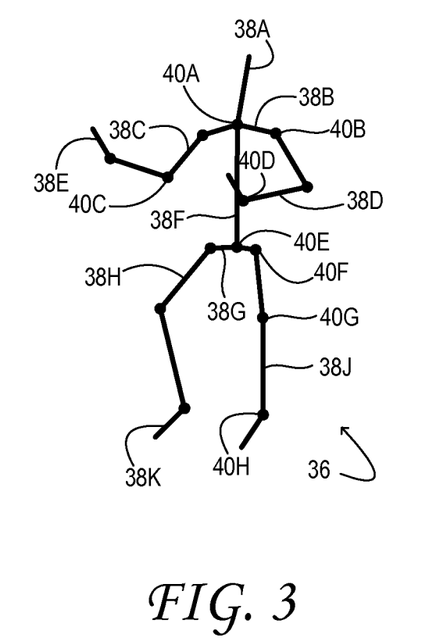
FIG. 3 shows aspects of a virtual skeleton in accordance with an embodiment of this disclosure.

At 34 a virtual skeleton of the subject is obtained based on the depth map acquired. FIG. 3 shows an example virtual skeleton 36 in one embodiment. The virtual skeleton includes a plurality of skeletal segments 38 pivotally coupled at a plurality of joints 40. In some embodiments, a body-part designation may be assigned to each skeletal segment and/or each joint. In FIG. 3, the body-part designation of each skeletal segment 38 is represented by an appended letter: A for the head, B for the clavicle, C for the upper arm, D for the forearm, E for the hand, F for the torso, G for the pelvis, H for the thigh, J for the lower leg, and K for the foot. Likewise, a body-part designation of each joint 40 is represented by an appended letter: A for the neck, B for the shoulder, C for the elbow, D for the wrist, E for the lower back, F for the hip, G for the knee, and H for the ankle. Naturally, the arrangement of skeletal segments and joints shown in FIG. 3 is in no way limiting. A virtual skeleton consistent with this disclosure may include virtually any type and number of skeletal segments and joints.

In one embodiment, each joint may be assigned various parameters—e.g., Cartesian coordinates specifying joint position, angles specifying joint rotation, and additional parameters specifying a conformation of the corresponding body part (hand open, hand closed, etc.). The virtual skeleton may take the form of a data structure including any or all of these parameters for each joint. In this manner, the metrical data defining the virtual skeleton—its size, shape, orientation, position, etc.—may be assigned to the joints.

Returning now to FIG. 2, the skeletal segments and/or joints of the virtual skeleton may be fit to the depth map at 34 of the method 30. This action may determine the appropriate positions, rotation angles, and other parameter values of the various joints of the skeleton. Via any suitable minimization approach, the lengths of the skeletal segments and the positions and rotational angles of the joints may be adjusted for agreement with the various contours of the depth map. In some embodiments, the act of fitting the skeletal segments may include assigning a body-part designation to a plurality of contours of the depth map. Optionally, the body-part designations may be assigned in advance of the minimization. As such, the fitting procedure may be informed by or based partly on the body-part designations. For example, a previously trained collection of body models may be used to label certain pixels from the depth map as belonging to a particular body part; a skeletal segment appropriate for that body part may then be fit to the labeled pixels. If a given contour is designated as the head of the subject, then the fitting procedure may seek to fit to that contour a skeletal segment pivotally coupled to a single joint—viz., the neck. If the contour is designated as a forearm, then the fitting procedure may seek to fit a skeletal segment coupled to two joints—one at each end of the segment. Furthermore, if it is determined that a given contour is unlikely to correspond to any body part of the subject, then that contour may be masked or otherwise eliminated from subsequent skeletal fitting. The foregoing description should not be construed to limit the range of approaches that may be used to construct a virtual skeleton, for a virtual skeleton may be derived from a depth map in any suitable manner without departing from the scope of this disclosure.

Continuing in FIG. 2, at 42 a set of characteristic metrics is harvested from the virtual skeleton obtained at 34. Such metrics may correspond to distances between predetermined points of the virtual skeleton. In some embodiments, the set of characteristic metrics may be related intelligibly to the size and shape of the subject's body. For example, the characteristic metrics may include one or more of a height, a leg length, an arm length, a shoulder width, a chest radius, a waist radius, a buttocks radius, an arm radius, and a leg radius of the subject.

At 44 the set of characteristic metrics harvested in this manner is provided as input to an algorithm configured to output a virtual body mesh resembling the subject's body. In other words, the algorithm computes the virtual body mesh as a function of the characteristic metrics. In some embodiments, the algorithm used for this purpose may be an algorithm trained using machine learning. More particularly, the algorithm may be one that has been trained using an actual human model in a range of poses and a range of human models in a single pose, as described in further detail below.

In one non-limiting embodiment, the virtual body mesh is constructed by deformation of a virtual body-mesh template M. The template is provided with a specific origin pose and shape captured from 360-degree, 3D scans of an actual human model. The pose and shape variations applied to this template are computed as affine transformations of each triangle of the template mesh M. Specifically, a triangle $p_k$ is identified by its edge $v_{k,j}$, which is defined as the vector from the $0^{th}$ vertex to the $j^{th}$ vertex: $v_{k,j} = y_{k,j} - y_{k,0}$ for $j = 1, 2$. Then, for a body mesh in a new pose and with a new shape, each new triangle $p^*_k$ is computed as a transformation of the corresponding template-mesh triangle $p_k$. In symbols, $$v_{k,j}^* = R_{I[k]} S_k Q_k v_{k,j},$$

where $R_I$ is the rotation of its rigid bone in the $I^{th}$ articulated skeleton. All triangles belonging to the same $I^{th}$-skeleton are provided the same rotation, thus $R_I = R_{I[k]}$. $Q_k$ is a 3×3 affine transformation matrix used to describe the deformation of each triangle edge caused by a change in pose. $S_k$ represents the body-shape deformation. Accordingly, a rotation, a body-pose transform, and a body shape transform are each applied to the virtual body-mesh template to obtain the virtual body mesh.

In this system, the rotation $R_I$s are obtained as described above, in the context of method step 34. The unknown $Q_k$ is computed from linear regression as follows. A range of 3D meshes of a single human model are captured in different poses. These meshes $M^i$ have the same topology and affine transformation $Q_k^i$ are computed by minimizing $$\operatorname{argmin}_Q \sum_k \sum_{j=1,2} \|R_k^i Q_k^i v_{k,j} - v_{k,j}^i\|^2 + w_S \sum_{p_{k_1}, p_{k_2} \text{adjacent to each other and } I(k_1) = I(k_2)} \|Q_{k_1}^i - Q_{k_2}^i\|^2.$$

Here, $w_s$ adjusts the weight of the second term. Given the set of estimated Q matrices and the known R represented by twist vectors, the relationship between Q and R can be linearly regressed. Thus, Q can be predicted from R, and the linear transformation from R to Q is stored in the system for fast computation.

For obtaining the body shape transform S, a range of 3D meshes of different human models are captured in the same pose. S is computed from R and Q by minimizing $$\operatorname{argmin}_S \sum_k \sum_{j=1,2} \|R_k^i S_k^i Q_k^i v_{k,j} - v_{k,j}^i\|^2 + w_S \sum_{p_{k_1}, p_{k_2} \text{adjacent to each other}} \|S_{k_1}^i - S_{k_2}^i\|^2.$$

To better represent the natural differences between female and male body types, the training process is applied on female models and male models separately. The characteristic metrics are also measured in 3D meshes. A linear map is built upon the metrics and shape transform matrices S that are represented by a 9×N vector, here N is the number of triangle faces of the template mesh. A principal component analysis (PCA) is performed on this linear space to capture the dominating subspace. Thus, given a set of characteristic metrics—for instance a set including a height, an arm length, a shoulder width, a chest radius and a waist radius—the body shape transform S can be approximated by PCA.

Figure 4:
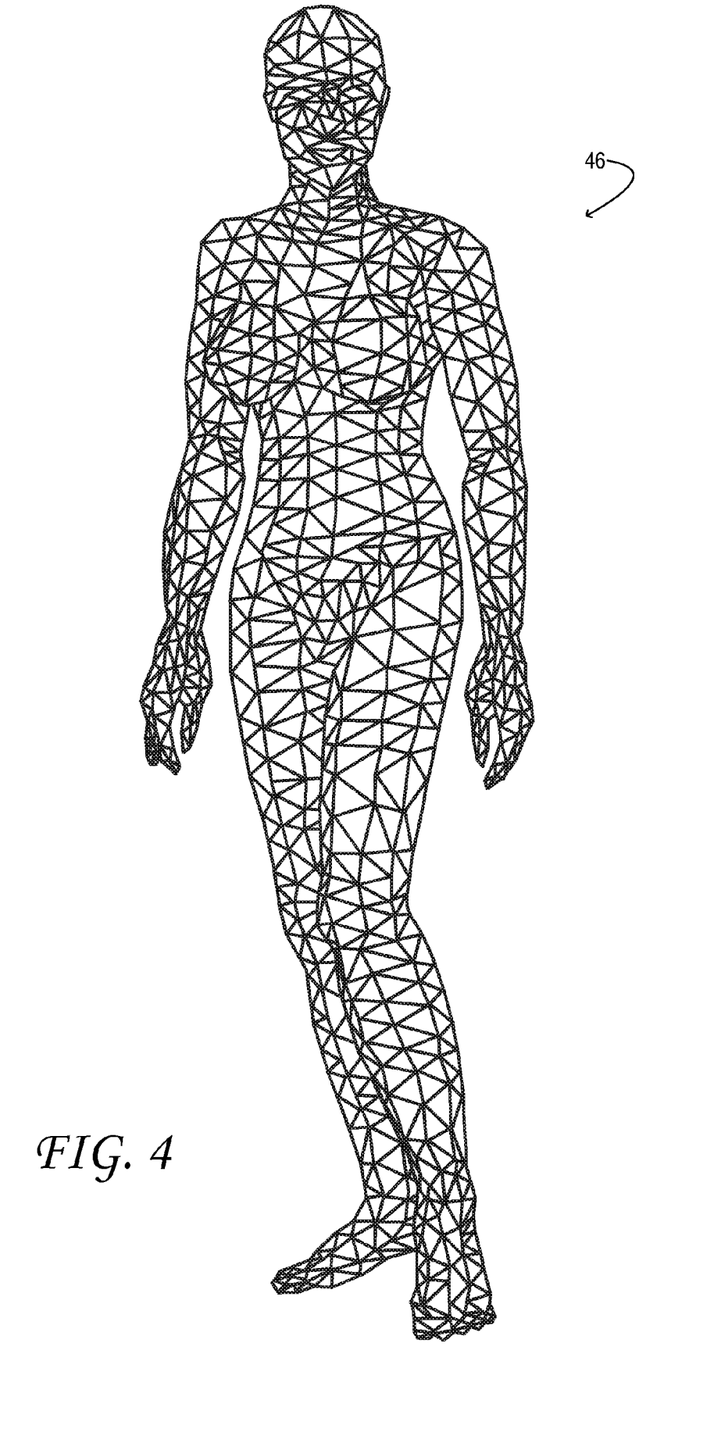
FIG. 4 shows aspects of a virtual body mesh in accordance with an embodiment of this disclosure.

A set of characteristic metrics are measured, and rotation Rs obtained for a given depth map and the virtual skeleton. Q and S can be computed as described in the foregoing paragraphs. Then, the final mesh is computed by solving a least squares system:

$$v_{k,j}^* = R_{I[k]} S_k Q_k v_{k,j},$$

where $v_{k,j}^* = y_{k,j}^* - y_{k,0}^*$ variables. Since this model is translation invariant, a vertex is anchored to a particular location by setting $y_0 = (0,0,0)$. FIG. 4 shows an example virtual body mesh 46 that can be constructed using the above algorithms.

Returning again to FIG. 2, at 48 the virtual body mesh may be optionally refined. More particularly, the virtual body mesh may be refined by varying the characteristic metrics to minimize distance between points on the depth map and corresponding points of the virtual body mesh. In one embodiment, the virtual body mesh may be refined by applying a nonlinear ICP algorithm. Regarding the set of characteristic metrics and the positions of the vertices of the final mesh as variables, the following quadratic function is minimized iteratively until the variance of the distance between the depth map and the final mesh is less than the predefined threshold or the maximum number of iterations is reached:

$$\Sigma_k \Sigma_{j=1,2} \|v_{k,j}^* - R_{I[k]} S_k Q_k v_{k,j}\|^2 + \text{weight} \times \text{distance}(\text{mesh}, \text{Depthmap}).$$

The final mesh is initialized from the result provided two equations above, and the characteristic metrics are initialized from the measurement. The distance between the mesh and the depth map is the summation of the squared distance between all the pairs of nearest close points.

At 50 of method 30, a virtual head mesh distinct from the virtual body mesh is constructed. The virtual head mesh may be constructed based on a second depth map different from the first depth map referred to hereinabove. The second depth map may be acquired when the subject is closer to the depth camera than when the first depth map is acquired. In one embodiment, the second depth map may be a composite of three different image captures of the subject's head: a front view, a view turned thirty degrees to the right, and a view turned thirty degrees to the left. In the second depth map, the subject's facial features may be resolved more finely than in the first depth map. In other embodiments, the subject's head may be rotated by angles greater than or less than thirty degrees between successive image captures.

To construct the virtual head mesh, a virtual head-mesh template may be deformed to minimize distance between points on the second depth map and corresponding points on the virtual head mesh. The virtual head mesh may then be augmented with color and texture derived from one or more image captures from the color camera of the user-input device. In this manner, the virtual head mesh may be personalized to resemble the actual human subject—viz., it may present facial features resembling those of the subject both in shape and in skin color/texture.

At 52 the virtual body mesh is connected to the virtual head mesh. In this step, the head of the virtual body template mesh is first cut out, and then is connected to the virtual head template mesh by triangulating the two open boundaries of the template meshes. The connected model is then stored in the system and loaded when the virtual body mesh and the virtual head mesh are ready. The two template meshes are replaced by two virtual meshes, respectively, since they have the same connectivities. The scale of the virtual head mesh is adjusted according to the proportion consistent with the virtual body mesh. The vertices around the neck are also smoothed, while the other vertices are held fixed. In this manner, a geometrically realistic and seamless head/body mesh may be constructed.

Figure 5:
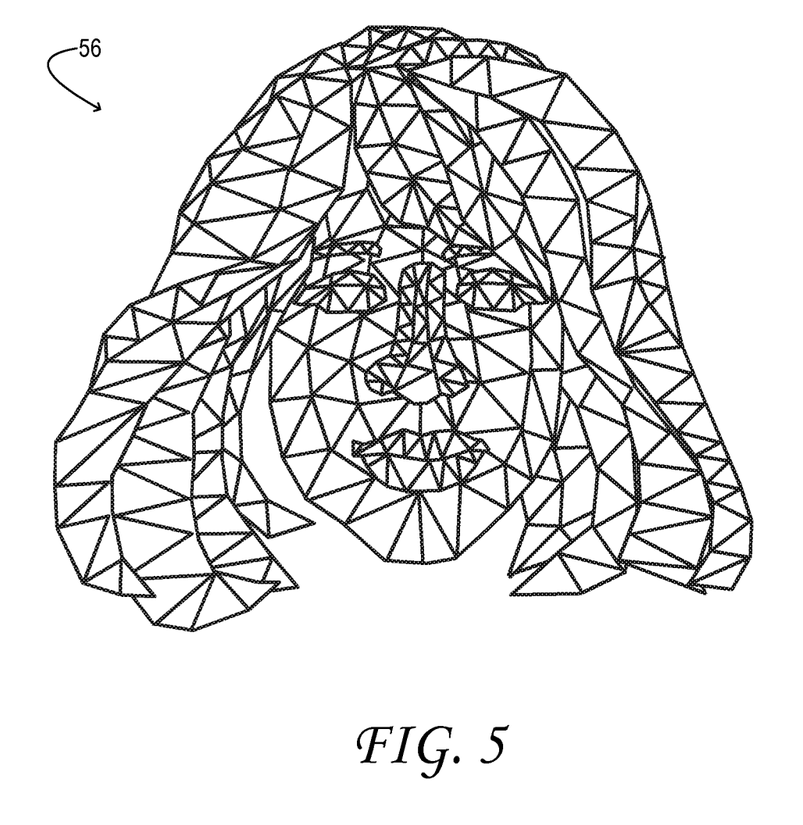
FIG. 5 shows aspects of a virtual head mesh in accordance with an embodiment of this disclosure.
Figure 6:
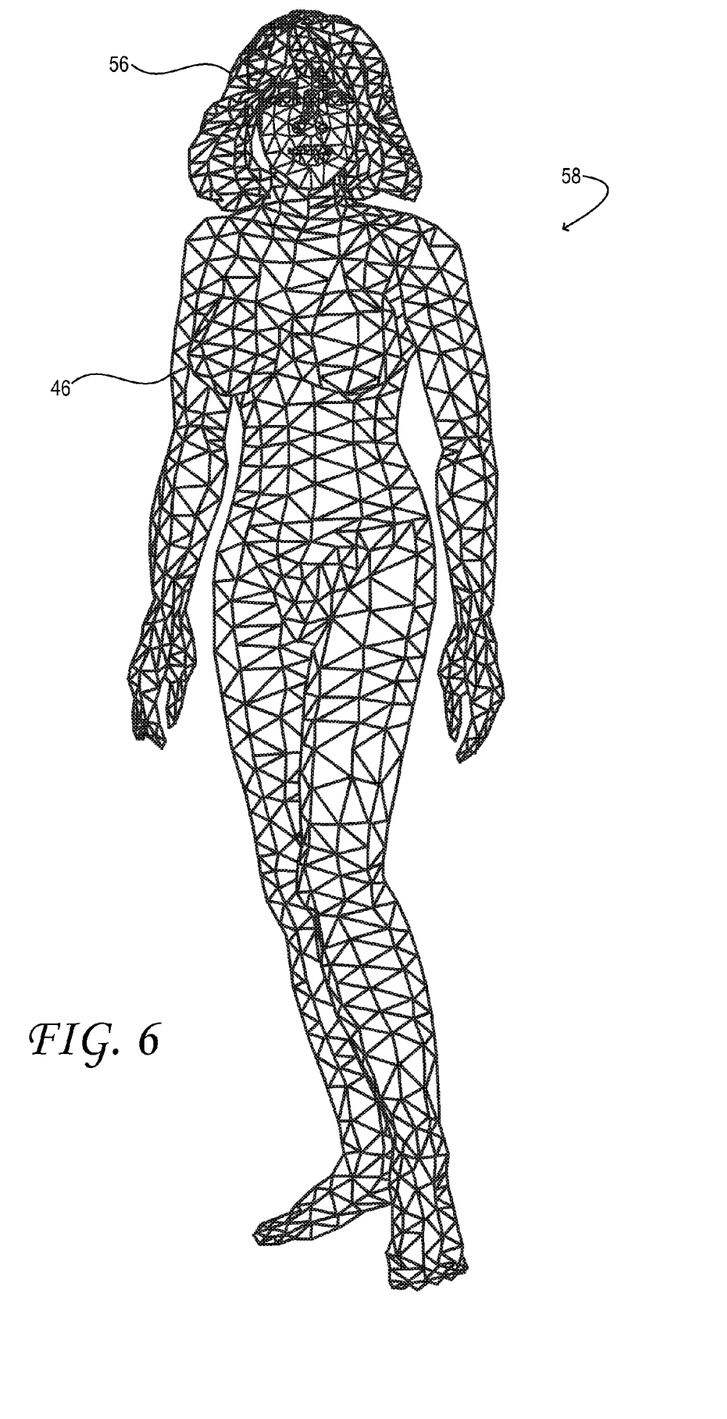
FIG. 6 shows aspects of a virtual head mesh connected to a virtual body mesh in accordance with an embodiment of this disclosure.

At 54 the virtual body mesh is augmented with a skin color and/or skin texture appropriate for the subject. In some embodiments, the skin color and/or skin texture may be selected based on color-image data from user-input device 14A—such as color image data from a region that includes the subject's face. In other words, the skin color and/or skin texture applied to the virtual body mesh may be synthesized to match that of the subject's face. In one embodiment, the system first selects a body texture image in a pre-designed database and then modulates the low frequency color component so that its overall color is consistent with the color of the face skin. FIG. 5 shows an example virtual head mesh 56. FIG. 6 shows a combined head/body mesh 58, in which the virtual head mesh 56 is connected to virtual body mesh 46.

Figure 7:
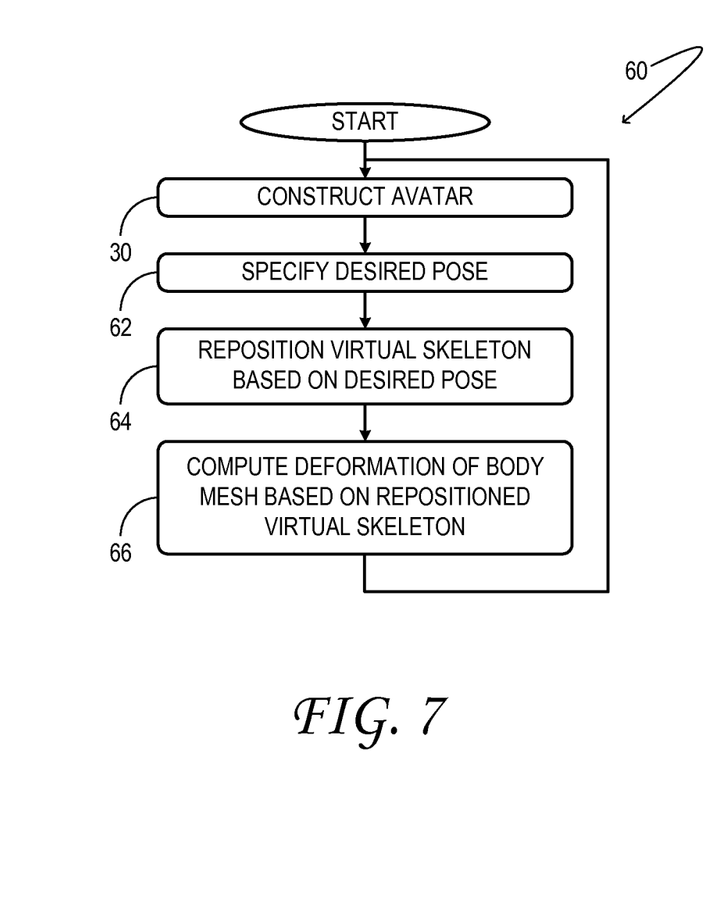
FIG. 7 illustrates a method to animate an avatar in accordance with an embodiment of this disclosure.

FIG. 7 illustrates an example method 60 to animate an avatar. At 30 of method 60, an avatar is constructed. In one embodiment, the avatar may be constructed according to the methods illustrated hereinabove. At 62 an initial desired pose for the animated avatar is specified. The initial desired pose may be a standing pose having arms outstretched, having the right hand raised, having the left leg lifted, etc. At 64 the virtual skeleton is repositioned based on the desired pose. At 66 a deformation of the virtual body mesh is computed, as described above, based on the repositioned virtual skeleton. In one embodiment, computing the deformation may include applying a linear skinning model to the virtual body mesh. In another embodiment, computing the deformation may include applying a mechanical skinning simulation to the virtual body mesh. In the mechanical skinning simulation, the motion of the subject's flesh and skin is simulated, according to Newtonian physics, as a function of the displacement of the virtual skeleton. From 66, the method may return to 62 with a subsequent desired pose specified. The subsequent desired pose may be an incrementally changed pose, for example. Accordingly, the steps of repositioning the virtual skeleton and computing the deformation of the virtual body mesh may be repeated in order to animate the avatar. In one embodiment, an avatar animated according to this approach may be used as a character in a video game.

In the approach contemplated herein, virtually any input mechanism may be used to specify the initial and subsequent desired poses for the avatar. Such mechanisms may include spoken commands directing body movement, or selection from among a menu of body movements and/or gestures via a user interface. In yet another embodiment, real-time skeletal tracking with user-input device 14A may guide the movement of the animated avatar. More particularly, the subject may specify the movement of the avatar simply by moving her own body in the manner desired for the avatar. The user-input device may be configured to track the movement of the subject's body, and provide a stream of gesture data to the personal computer on which method 60 is enacted.

Figure 8:
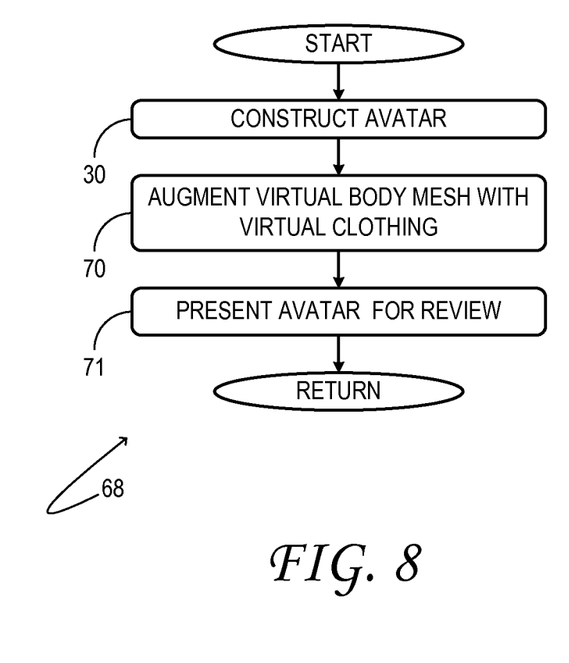
FIG. 8 illustrates a method to use an avatar in a retail setting in accordance with an embodiment of this disclosure.
Figure 9:
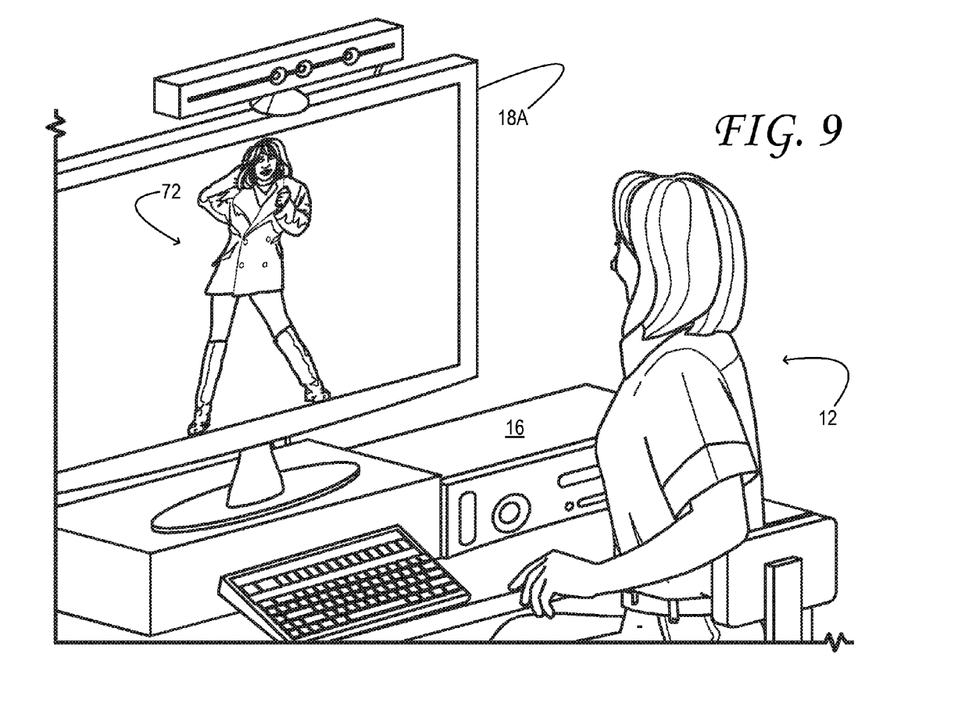
FIG. 9 illustrates the presentation and review of an avatar in accordance with an embodiment of this disclosure.

FIG. 8 illustrates an example method 68 to use an avatar in a retail setting. At 30 of method 68, an avatar is constructed—e.g., according to the methods illustrated hereinabove. At 70, the virtual body mesh of the avatar is augmented with virtual clothing. The virtual clothing may be modeled to resemble actual clothing for sale to the subject. At 71, the avatar so constructed and so clothed is presented for review by the subject. The avatar may be presented for review on a video monitor at a retail establishment, or in the subject's home or workplace, etc. FIG. 9 illustrates the presentation and review of avatar 72 by subject 12, in one example scenario. It will be noted that aspects from the various methods described herein may be used together. For instance, the clothed avatar presented for review to the subject in method 68 may also be animated according to method 60.

In some embodiments, the methods and processes described above may be tied to a computing system of one or more computing devices. In particular, such methods and processes may be implemented as a computer-application program or service, an application-programming interface (API), a library, and/or other computer-program product.

Figure 10:
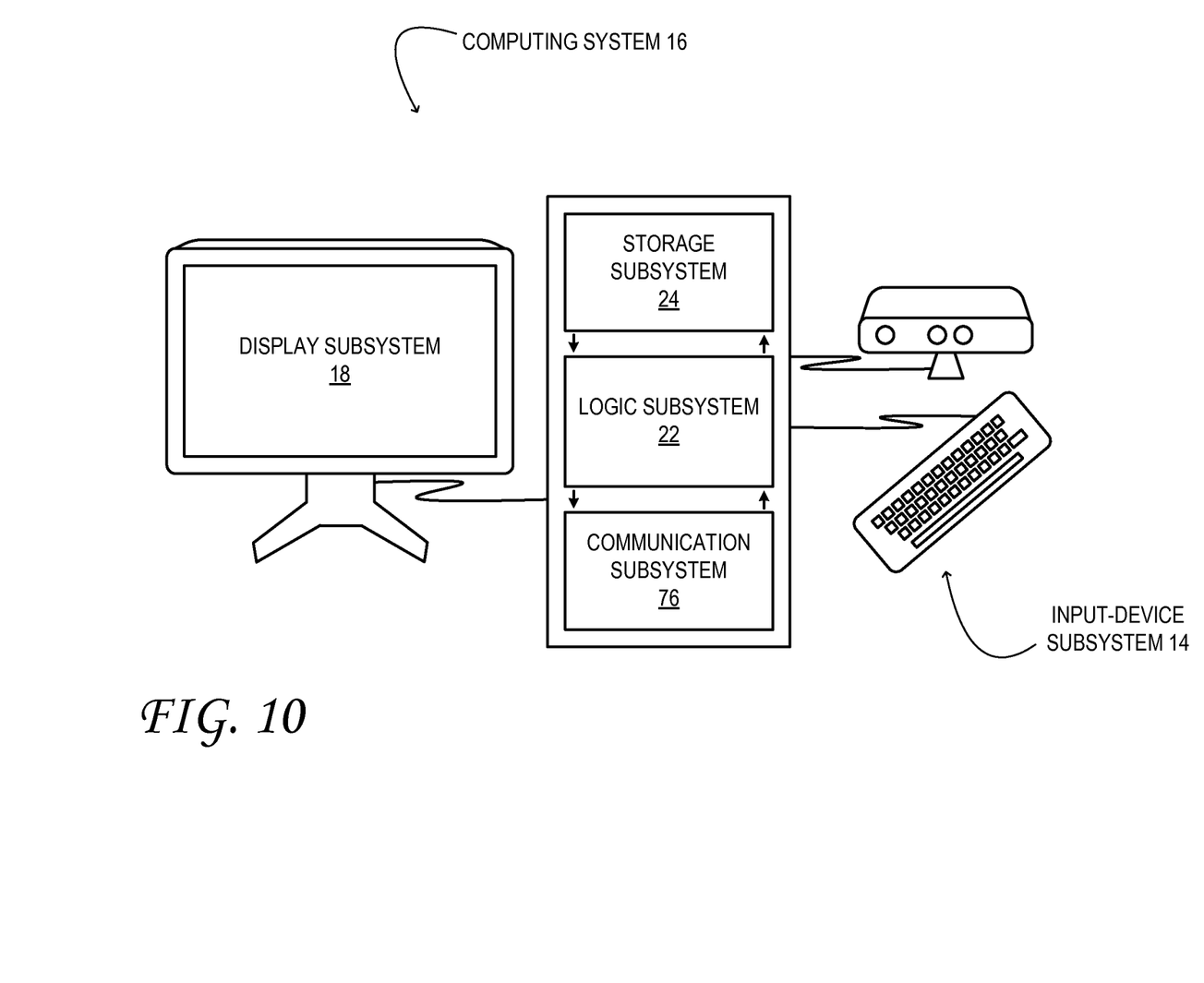
FIG. 10 schematically shows aspects of a computing system in accordance with an embodiment of this disclosure.

FIG. 10 schematically shows a non-limiting embodiment of a computing system 16 that can perform one or more of the methods and processes described above. Computing system 16 is shown in simplified form. It will be understood that virtually any computer architecture may be used without departing from the scope of this disclosure. In different embodiments, computing system 16 may take the form of a mainframe computer, server computer, desktop computer, laptop computer, tablet computer, home-entertainment computer, network computing device, gaming device, mobile computing device, mobile communication device (e.g., smart phone), etc.

Computing system 16 includes a logic subsystem 22 and a storage subsystem 24. Computing system 16 may optionally include a display subsystem 18, input-device subsystem 14, communication subsystem 76, and/or other components not shown in FIG. 10. Computing system 16 may also optionally include or interface with one or more user-input devices such as a keyboard, mouse, game controller, camera, microphone, and/or touch screen, for example. Such user-input devices may form part of input-device subsystem 14 or may interface with input-device subsystem 14.

Logic subsystem 22 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem may include one or more processors configured to execute software instructions. Additionally or alternatively, the logic subsystem may include one or more hardware or firmware logic machines configured to execute hardware or firmware instructions. The processors of the logic subsystem may be single-core or multi-core, and the programs executed thereon may be configured for sequential, parallel or distributed processing. The logic subsystem may optionally include individual components that are distributed among two or more devices, which can be remotely located and/or configured for coordinated processing. Aspects of the logic subsystem may be virtualized and executed by remotely accessible networked computing devices configured in a cloud-computing configuration.

Storage subsystem 24 includes one or more physical, non-transitory, devices configured to hold data and/or instructions executable by the logic subsystem to implement the herein-described methods and processes. When such methods and processes are implemented, the state of storage subsystem 24 may be transformed—e.g., to hold different data.

Storage subsystem 24 may include removable media and/or built-in devices. Storage subsystem 24 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 24 may include volatile, nonvolatile, dynamic, static, read/write, read-only, random-access, sequential-access, location-addressable, file-addressable, and/or content-addressable devices.

It will be appreciated that storage subsystem 24 includes one or more physical, non-transitory devices. However, in some embodiments, aspects of the instructions described herein may be propagated in a transitory fashion by a pure signal—e.g., an electromagnetic or optical signal, etc.—that is not held by a physical device for a finite duration. Furthermore, data and/or other forms of information pertaining to the present disclosure may be propagated by a pure signal.

In some embodiments, aspects of logic subsystem 22 and of storage subsystem 24 may be integrated together into one or more hardware-logic components through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

The terms "module," "program," and "engine" may be used to describe an aspect of computing system 16 implemented to perform a particular function. In some cases, a module, program, or engine may be instantiated via logic subsystem 22 executing instructions held by storage subsystem 24. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 18 may be used to present a visual representation of data held by storage subsystem 24. This visual representation may take the form of a graphical user interface (GUI). As the herein described methods and processes change the data held by the storage subsystem, and thus transform the state of the storage subsystem, the state of display subsystem 18 may likewise be transformed to visually represent changes in the underlying data. Display subsystem 18 may include one or more display devices utilizing virtually any type of technology. Such display devices may be combined with logic subsystem 22 and/or storage subsystem 24 in a shared enclosure, or such display devices may be peripheral display devices.

When included, communication subsystem 76 may be configured to communicatively couple computing system 16 with one or more other computing devices. Communication subsystem 76 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 16 to send and/or receive messages to and/or from other devices via a network such as the Internet.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for constructing an avatar of a human subject, the method comprising:
   acquiring a depth map of the human subject;
   obtaining a virtual skeleton of the human subject based on the depth map;
   harvesting from the virtual skeleton a set of characteristic metrics corresponding to distances between predetermined points of the virtual skeleton;
   providing the characteristic metrics as input to an algorithm trained using machine learning, the algorithm having been trained using at least one single human being in a range of poses and a range of human beings in a single pose, to output a virtual body mesh as a function of the characteristic metrics;
   refining the virtual body mesh by varying the characteristic metrics to decrease distance between points on the depth map and corresponding points of the virtual body mesh;
   constructing a virtual head mesh, distinct from the virtual body mesh, with facial features resembling those of the human subject; and
   connecting the virtual body mesh to the virtual head mesh.

2. The method of claim 1 further comprising repositioning the virtual skeleton and computing a deformation of the virtual body mesh based on the repositioned virtual skeleton.

3. The method of claim 2 wherein computing the deformation includes applying a linear skinning model to the virtual body mesh.

4. The method of claim 2 wherein computing the deformation includes applying a mechanical skinning simulation to the virtual body mesh.

5. The method of claim 2 further comprising repeating said repositioning and said computing to animate the avatar.

6. The method of claim 5 further comprising using the animated avatar as a character in a video game.

7. The method of claim 1 wherein the set of characteristic metrics are related to a size and shape of a body of the human subject.

8. The method of claim 1 further comprising applying a rotation, a body-pose transform, and a body shape transform to a virtual body-mesh template to obtain the virtual body mesh.

9. The method of claim 1 wherein the depth map is a first depth map, and wherein the virtual head mesh is constructed based on a second depth map, in which one or more facial features of the human subject are more finely resolved than in the first depth map.

10. The method of claim 9 further comprising deforming a virtual head-mesh template to minimize distance between points on the second depth map and corresponding points on the virtual head mesh.

11. The method of claim 1 further comprising augmenting the virtual body mesh with a body texture synthesized to match a face and skin texture of the human subject.

12. The method of claim 1 further comprising augmenting the virtual body mesh with virtual clothing modeled to resemble actual clothing for sale to the human subject.

13. The method of claim 12 further comprising presenting the avatar so constructed and so clothed for review by the human subject.

14. A method for constructing an avatar of a human subject, the method comprising:
acquiring a depth map of the human subject;
obtaining a virtual skeleton of the human subject based on the depth map;
harvesting from the virtual skeleton a set of characteristic metrics corresponding to distances between predetermined points of the virtual skeleton;
providing the characteristic metrics as input to an algorithm trained using machine learning, the algorithm having been trained using at least one single human being in a range of poses and a range of human beings in a single pose, to output a virtual body mesh as a function of the characteristic metrics;
refining the virtual body mesh by varying the characteristic metrics to minimize a distance between points on the depth map and corresponding points of the virtual body mesh;
constructing a virtual head mesh, distinct from the virtual body mesh, with facial features resembling those of the human subject; and
connecting the virtual body mesh to the virtual head mesh.

15. The method of claim 14 wherein the virtual body mesh is refined by applying an iterative closest-point algorithm.

16. A system for constructing an avatar of a human subject, the system comprising
a logic subsystem;
a storage subsystem holding instructions executable by the logic subsystem to:
obtain a virtual skeleton of the human subject based on a depth map,
harvest from the virtual skeleton a set of characteristic metrics corresponding to distances between predetermined points of the virtual skeleton,
provide the characteristic metrics as input to an algorithm trained using machine learning, the algorithm having been trained using at least one single human being in a range of poses and a range of human beings in a single pose, to output a virtual body mesh as a function of the characteristic metrics,
refine the virtual body mesh by varying the characteristic metrics to decrease distance between points on the depth map and corresponding points of the virtual body mesh;
augment the virtual body mesh with virtual clothing;
construct a virtual head mesh, distinct from the virtual body mesh, with facial features resembling those of the human subject, and
connect the virtual body mesh to the virtual head mesh.

17. The system of claim 16 further comprising:
a depth camera operatively coupled to the logic subsystem and configured to acquire a depth map of the human subject; and
a color camera operatively coupled to the logic subsystem and configured to acquire a color image of a face of the human subject;
wherein the instructions cause the logic subsystem to augment the virtual body mesh with one or more of a skin color and a skin texture derived from the color image.

18. The system of claim 16 wherein the characteristic metrics include one or more of a height, a leg length, an arm length, a shoulder width, a chest radius, a waist radius, a buttocks radius, an arm radius, and a leg radius.

19. The system of claim 16 wherein the range of poses includes one or more standing poses and one or more sitting poses.

20. The system of claim 16 wherein the range of human beings includes male and female human beings of varying body height and of varying body weight.

* * * * *